US010537805B2

(12) United States Patent
Desjardins et al.

(10) Patent No.: US 10,537,805 B2
(45) Date of Patent: Jan. 21, 2020

(54) SYSTEM AND METHOD FOR PLACING A CHARACTER ANIMATION AT A LOCATION IN A GAME ENVIRONMENT

(71) Applicant: SQUARE ENIX LTD, London (GB)

(72) Inventors: Joel Desjardins, Montreal (CA); Jeremie Mallette-Lachance, Montreal (CA)

(73) Assignee: SQUARE ENIX LIMITED, London (GB)

( * ) Notice: Subject to any disclaimer, the term of this patent is extended or adjusted under 35 U.S.C. 154(b) by 240 days.

(21) Appl. No.: 15/617,851

(22) Filed: Jun. 8, 2017

(65) Prior Publication Data
US 2018/0005426 A1 Jan. 4, 2018

Related U.S. Application Data

(60) Provisional application No. 62/348,361, filed on Jun. 10, 2016.

(30) Foreign Application Priority Data

May 26, 2017 (CA) ........................... 2968589

(51) Int. Cl.
A63F 13/56 (2014.01)
A63F 13/52 (2014.01)
(Continued)

(52) U.S. Cl.
CPC .............. A63F 13/56 (2014.09); A63F 13/52 (2014.09); G06T 7/60 (2013.01); A63F 2300/64 (2013.01);
(Continued)

(58) Field of Classification Search
CPC .............. A63F 13/552; A63F 13/55–57; A63F 2300/64; A63F 13/52; G06T 13/40;
(Continued)

(56) References Cited

U.S. PATENT DOCUMENTS

2002/0171647 A1* 11/2002 Sterchi .................... G06T 13/40
345/473
2005/0071306 A1* 3/2005 Kruszewski ............ A63F 13/10
706/47
(Continued)

FOREIGN PATENT DOCUMENTS

EP 1744284 A1 1/2017

OTHER PUBLICATIONS

The Quake III Arena Bot, J.M.P. van Waveren, University of Technology Delft, Faculty ITS, Jun. 28, 2001, Revision 1 (XP-002433838).

(Continued)

Primary Examiner — Jasson H Yoo
(74) Attorney, Agent, or Firm — Duane Morris LLP

(57) ABSTRACT

A method for execution by a processor of a computer system for computer gaming. The method comprises maintaining a game environment; receiving a request to execute an animation routine during gameplay; attempting to identify a location in the game environment having a surrounding area that is free to host the requested animation routine; and in case the attempting is successful, carrying out the animation routine at the identified location in the game environment.

27 Claims, 10 Drawing Sheets

(51) Int. Cl.
*G06T 7/60* (2017.01)
*G06T 15/00* (2011.01)

(52) U.S. Cl.
CPC ........ *G06T 15/005* (2013.01); *G06T 2200/04* (2013.01)

(58) Field of Classification Search
CPC ..... G06T 19/003; G06T 15/20; G06T 15/005; G06T 2200/04
See application file for complete search history.

(56) References Cited

U.S. PATENT DOCUMENTS

| | | |
|---|---|---|
| 2005/0248570 A1 | 11/2005 | Stelly, III |
| 2006/0233098 A1 | 10/2006 | McArdle |
| 2006/0252533 A1* | 11/2006 | Sakaguchi .............. A63F 13/10 463/31 |
| 2010/0190556 A1 | 7/2010 | Chan |
| 2011/0074768 A1* | 3/2011 | Takayama .............. G06T 13/80 345/419 |

OTHER PUBLICATIONS

Extended European Search Report dated Nov. 6, 2017, in corresponding European Patent Application No. 17174413.9.

\* cited by examiner

| Animation routine | Animation radius |
|---|---|
| Animation 1 | 1.5 m |
| Animation 2 | 3.5 m |
| Animation 3 | 4.5 m |

FIG. 6A

| Animation routine | Animation radius |
|---|---|
| Animation 1 | 1.5 m |
| Animation 1 (reduced) | 1.2 m |
| Animation 1 (extra reduced) | 0.8 m |

FIG. 6B

SYSTEM AND METHOD FOR PLACING A CHARACTER ANIMATION AT A LOCATION IN A GAME ENVIRONMENT

CROSS-REFERENCE TO RELATED APPLICATION

The present application claims the benefit of U.S. Provisional Patent Application Ser. No. 62/348,361 entitled "SYSTEM AND METHOD FOR PLACING A CHARACTER ANIMATION AT A LOCATION IN A GAME ENVIRONMENT", filed on Jun. 10, 2016, and Canadian Application No. 2968589, filed May 26, 2017, entitled; SYSTEM AND METHOD FOR PLACING A CHARACTER ANIMATION AT A LOCATOIN IN A GAME ENVIRONMENT, both of which are hereby incorporated by reference herein.

FIELD

The present application relates generally to video games that feature takedowns and other character animations and, in particular, to determining where in the game environment to place a requested animation.

BACKGROUND

In many action games, a playing character may wish to engage in close combat with another character (possibly a non-playing character—NPC). In such instances, to animate/render this combat on-screen, a scripted takedown routine may be called. However, interference with the local geometry of the game environment may cause the takedown routine to appear unnatural when rendered on-screen. This may lead to an undesirable gaming experience.

SUMMARY

According to a first broad aspect, there is provided a method for execution by a processor of a computer system. The method comprises maintaining a game environment; receiving a request to execute an animation routine during gameplay; attempting to identify a location in the game environment having a surrounding area that is free to host the requested animation routine; and in case the attempting is successful, carrying out the animation routine at the identified location in the game environment.

According to a second broad aspect, there is provided a computer system, comprising a memory storing data and program instructions, the data representing a game environment and a processor configured to execute the program instructions stored in the memory. Execution of the program instructions causes the computer to implement a method that comprises: receiving a request to execute an animation routine; attempting to identify a location in the game environment having a surrounding area that is free to host the requested animation routine; and in case the attempting is successful, carrying out the animation routine at the identified location in the game environment.

According to a third broad aspect, there is provided a computer-readable medium comprising computer-readable program instructions which, when executed by a processor of a computer system running a game environment, causes the processor to implement a method in the game environment. The method comprises receiving a request to execute an animation routine; attempting to identify a location in the game environment having a surrounding area that is free to host the requested animation routine; and in case the attempting is successful, carrying out the animation routine at the identified location in the game environment.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 6A is a table that associates animation routines with corresponding animation radii;

FIG. 6B is a table that associates different constrained versions of the same animation routine with corresponding animation radii;

It is to be expressly understood that the description and drawings are only for the purpose of illustration of certain embodiments of the invention and are an aid for understanding. They are not intended to be a definition of the limits of the invention.

DETAILED DESCRIPTION

Figure 1:
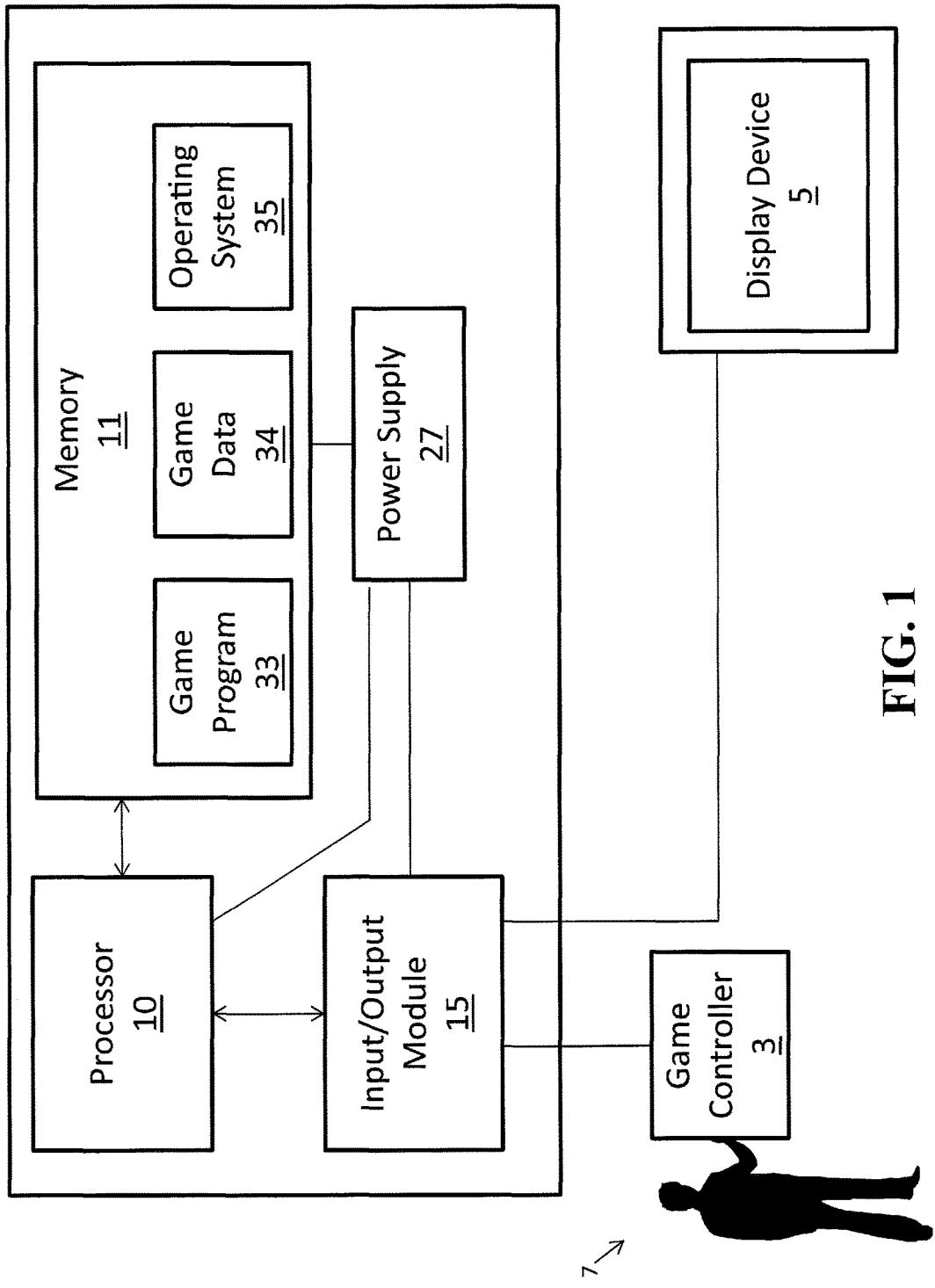
FIG. 1 is a block diagram illustrating a configuration of a game apparatus implementing an example non-limiting embodiment of the present invention.

FIG. 1 is a block diagram illustrating a configuration of a game apparatus 1 implementing an example non-limiting embodiment of the present invention. In some cases, the game apparatus 1 is a dedicated gaming console similar to an Xbox™, Playstation™, or Nintendo™ gaming console. In other cases, the game apparatus 1 is a multi-purpose workstation or laptop computer. In still other cases, the game apparatus 1 is a mobile device such as a smartphone. In yet other cases, the game apparatus 1 is a handheld game console.

The game apparatus 1 includes at least one processor 10, at least one computer readable memory 11, at least one input/output module 15 and at least one power supply unit 27, and may include any other suitable components typically found in a game apparatus used for playing video games. The various components of the game apparatus 1 may communicate with each other over one or more buses, which can be data buses, control buses, power buses and the like.

As shown in FIG. 1, a player 7 is playing a game by viewing game images displayed on a screen of a display device 5 and controlling aspects of the game via a game controller 3. Accordingly, the game apparatus 1 receives inputs from the game controller 3 via the input/output module 15. The game apparatus 1 also supplies outputs to the display device 5 and/or an auditory device (e.g., a speaker, not shown) via the input/output module 15. In other implementations, there may be more than one game controller 3 and/or more than one display device 5 connected to the input/output module 15.

The processor 10 may include one or more central processing units (CPUs) having one or more cores. The processor 10 may also include at least one graphics processing unit (GPU) in communication with a video encoder/video codec (coder/decoder, not shown) for causing output data to be supplied to the input/output module 15 for display on the display device 5. The processor 10 may also include at least one audio processing unit in communication with an audio encoder/audio codec (coder/decoder, not shown) for causing output data to be supplied to the input/output module 15 to the auditory device.

The computer readable memory 11 may include RAM (random access memory), ROM (read only memory), flash memory, hard disk drive(s), DVD/CD/Blu-ray™ drive and/or any other suitable memory device, technology or configuration. The computer readable memory 11 stores a variety of information including a game program 33, game data 34 and an operating system 35.

When the game apparatus 1 is powered on, the processor 10 is configured to run a booting process which includes causing the processor 10 to communicate with the computer readable memory 11. In particular, the booting process causes execution of the operating system 35. The operating system 35 may be any commercial or proprietary operating system suitable for a game apparatus. Execution of the operating system 35 causes the processor 10 to generate images displayed on the display device 5, including various options that are selectable by the player 7 via the game controller 3, including the option for the player 7 to start and/or select a video game to be played. The video game selected/started by the player 7 is encoded by the game program 33.

The processor 10 is configured to execute the game program 33 such that the processor 10 is able to perform various kinds of information processing functions related to the video game that it encodes. In particular, and with reference to FIG. 2, execution of the game program 33 causes the processor to execute a game data processing function 22 and game rendering processing function 24, which are now described.

Figure 2:
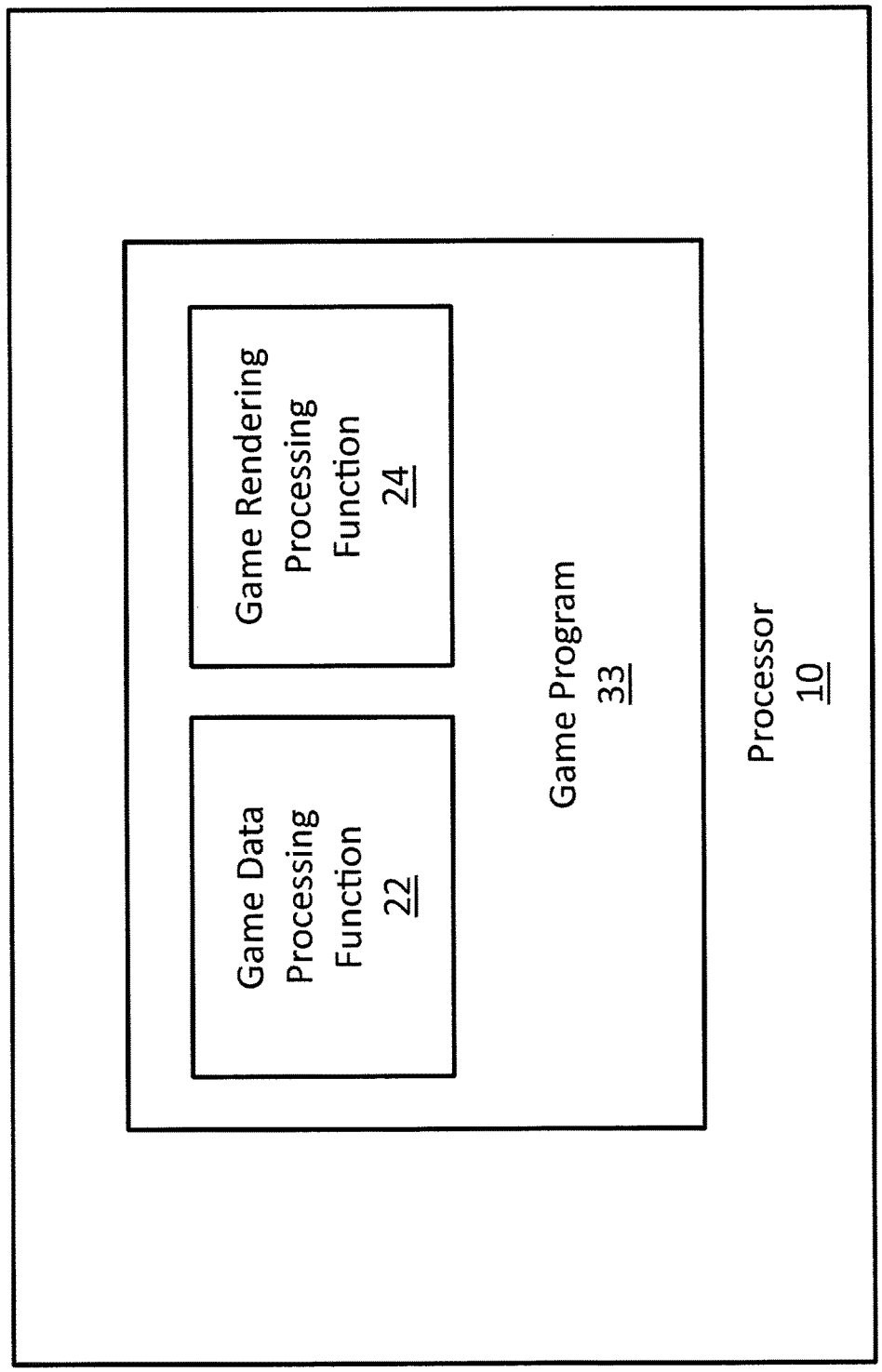
FIG. 2 shows components of a game program executed by the game apparatus of FIG. 1, including a game data processing function and a game rendering processing function.

The game rendering processing function 24 includes generation of a game image to be displayed on the display device 5. For its part, the game data processing function 22 includes processing of information representing progress of the game or a current state of the game (e.g., processing of information relating to the game that is not necessarily displayed on the display device 5). The game data processing function 22 and the game rendering processing function 24 are illustrated in FIG. 2 as forming part of a single game program 33. However, in other embodiments, the game data processing function 22 and the game rendering processing function 24 may be separate programs stored in separate memories and executed by separate, possibly distant, processors. For example, the game data processing function 22 may be performed on a CPU and the game rendering processing function 24 may be performed on a GPU.

Figure 3:
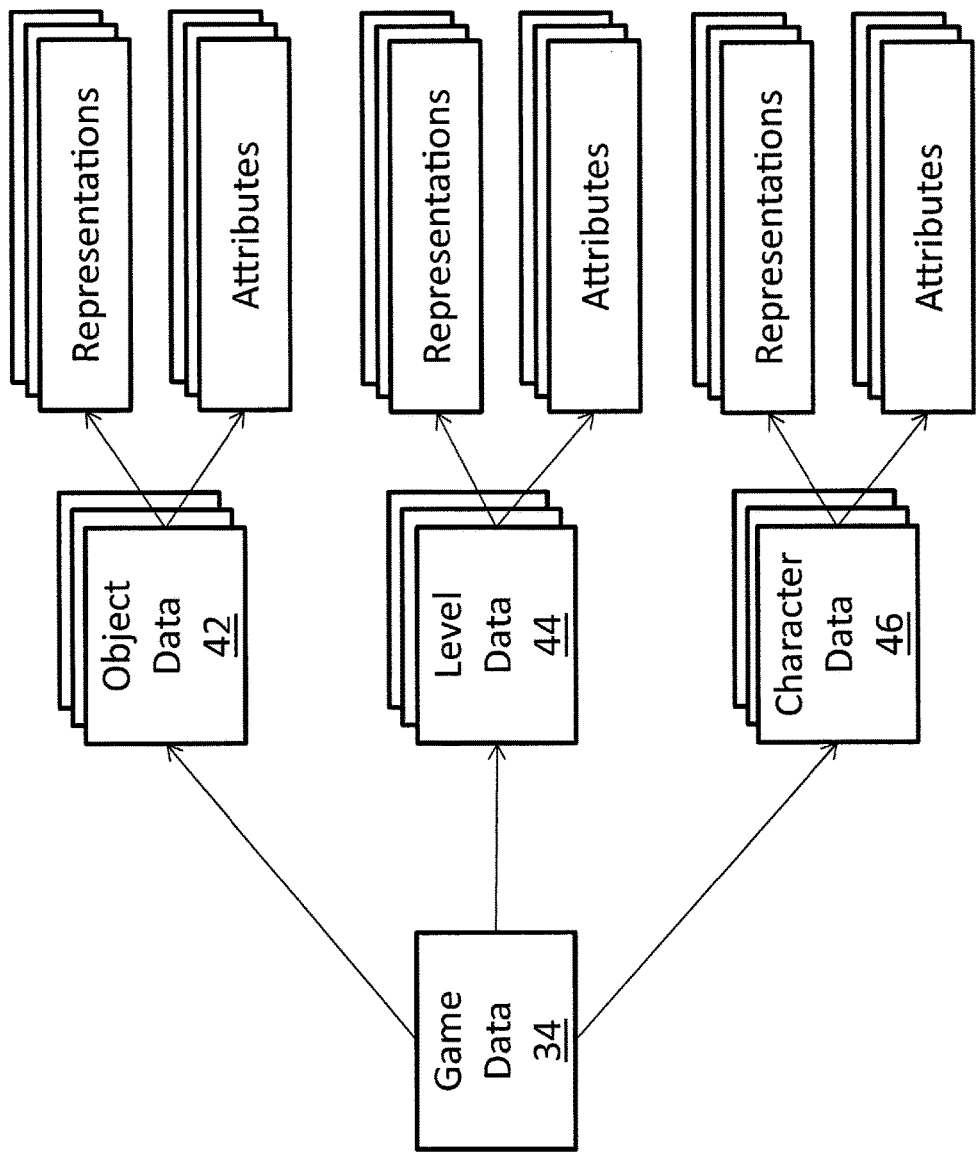
FIG. 3 shows examples of game data according to a present example embodiment.

In the course of executing the game program 33, the processor 10 manipulates constructs such as objects, characters and/or levels according to certain game rules and applying certain artificial intelligence algorithms. In the course of executing the game program 33, the processor 10 creates, loads, stores, reads and generally accesses the game data 34, which includes data related to the object(s), character(s) and/or level(s). FIG. 3 shows an example illustrating examples of game data 34 according to a present example embodiment. The game data 34 may include data related to the aforementioned constructs and therefore may include object data 42, level data 44 and/or character data 46.

An object may refer to any element or portion of an element in the game environment that can be displayed graphically in a game image frame. An object may include 3-dimensional representations of buildings, vehicles, furniture, plants, sky, ground, ocean, sun, and/or any other suitable elements. The object may have other non-graphical representations such numeric, geometric or mathematical representations. The object data 42 stores data relating to the current representation of the object such as the graphical representation in a game image frame or a numeric, geometric or mathematical representation. The object data 42 may also store attributes such as imaging data, position data, material/texture data, physical state data, visibility data, lighting data (e.g., direction, position, color and/or intensity), sound data, motion data, collision data, environment data, timer data and/or other data associated with the object. Certain attributes of an object may be controlled by the game program 33.

A character is similar to an object except that the attributes are more dynamic in nature and it has additional attributes that objects typically do not have. For example, certain attributes of a playing character may be controlled by the player 7. Certain attributes of a character, be it a playing character or a non-playing character, may be controlled by the game program 33. Examples of characters include a person, an avatar, an animal, and/or any other suitable object. The character may have other non-visual representations such as numeric, geometric or mathematical representations. A character may be associated with one or more objects such as a weapons held by a character or clothes donned by the character. The character data 46 stores data relating to the current representation of the character such as the graphical representation in a game image frame or a numeric, geometric or mathematical representation. The character data 46 may also store attributes such as imaging data, position data, material/texture data, physical state data, visibility data, lighting data (e.g., direction, position, color and/or intensity), sound data, motion data, collision data, environment data, timer data and/or other data associated with the character.

The game data 34 may also include data relating to the current view or camera angle of the game (e.g., first-person view, third-person view, etc.) as displayed on the display device 5 which may be part of the representations and/or attributes of the object data 42, level data 44 and/or character data 46.

In executing the game program 33, the processor 10 may cause an initialization phase to occur after the player 7 has selected/started the game, causing initialization of the game. The initialization phase is used to carry out any necessary game setup and prepare the game data 34 for the start of the game. The game data 34 changes during the processing of the game program 33 (i.e., during the playing of the game) and the terminology "game state" is used herein to define the current state or properties of the game data 34 and hence the various object data 42, level data 44 and/or character data 46 and their corresponding representations and/or attributes.

After the initialization phase, the processor 10 in execution of the game program 33 may implement one or more game loops. The one or more game loops run continuously during gameplay causing the game data processing function 22 and the game rendering processing function 24 to be routinely performed.

A game loop may be implemented, whereby (i) the game data processing function 22 is performed to process the player's input via the game controller 3 and to update the game state and afterwards (ii) the game rendering processing function 24 is performed to cause the game image to be rendered based on the updated game state for display on the display device 5. The game loop may also track the passage of time to control the rate of gameplay. It should be appreciated that parameters other than player inputs can influence the game state. For example, various timers (e.g., elapsed time, time since a particular event, virtual time of day, etc.) can have an effect on the game state. In other words, the game keeps moving even when the player 7 isn't providing input and as such, the game state may be updated in the absence of the player's input.

In general, the number of times the game data processing function 22 is performed per second specifies the updates to the game state per second (hereinafter "updates per second") and the number of times the game rendering processing function 24 is performed per second specifies game image rendering per second (hereinafter "frames per second"). In theory the game data processing function 22 and the game rendering processing function 24 would be called the same number of times per second. By way of a specific and non-limiting example, if the target is 25 frames per second, it would be desirable to have the game data processing function 22 and the game rendering processing function 24 both being performed every 40 ms (i.e., 1 s/25 FPS). In the case where the game data processing function 22 is performed and afterwards the game rendering processing function 24 is performed, it should be appreciated that both the game data processing function 22 and the game rendering processing function 24 would need to be performed in the 40 ms time window. Depending on the current game state, it should be appreciated that the time of performing the game data processing function 22 and/or the game rendering processing function 24 may vary. If both the game data processing function 22 and the game rendering processing function 24 take less than 40 ms to perform, a sleep timer may be used before performing the next cycle of the game data processing function 22 and the game rendering processing function 24. However, if the game data processing function 22 and the game rendering processing function 24 take more than 40 ms to perform for a given cycle, one technique is to skip displaying of a game image to achieve a constant game speed.

It should be appreciated that the target frames per second may be more or less than 25 frames per second (e.g., 60 frames per second); however, it may be desired that the game data processing function 22 and the game rendering processing function 24 be performed not less than 20 to 25 times per second so that the human eye won't notice any lag in the rendering of the game image frames. Naturally, the higher the frame rate, the less time between images and the more powerful the processor(s) require to execute the game loop, hence the reliance on specialized processor such as GPUs.

In other embodiments, the game data processing function 22 and the game rendering processing function 24 may be separate game loops and hence independent processes. In such cases, the game data processing function 22 may be routinely performed at a specific rate (i.e., a specific number of updates per second) regardless of when the game rendering processing function 24 is performed and the game rendering processing function 24 may be routinely performed at a specific rate (i.e., a specific number of frames per second) regardless of when the game data processing function 22.

It should be appreciated that the process of routinely performing, the game data processing function 22 and the game rendering processing function 24 may be implemented according to various techniques within the purview of the person skilled in the art and the techniques described in this document are non-limiting examples of how the game data processing function 22 and the game rendering processing function 24 may be performed.

When the game data processing function 22 is performed, the player input via the game controller 3 (if any) and the game data 34 is processed. More specifically, as the player 7 plays the video game, the player 7 inputs various commands via the game controller 3 such as move left, move right, jump, shoot, to name a few examples. In response to the player input, the game data processing function 22 may update the game data 34. In other words, the object data 42, level data 44 and/or character data 46 may be updated in response to player input via the game controller 3. It should be appreciated that every time the game data processing function 22 is performed, there may not be any player input via the game controller 3. Regardless of whether player input is received, the game data 34 is processed and may be updated. Such updating of the game data 34 may be in response to representations and/or attributes of the object data 42, level data 44 and/or character data 46 as the representations and/or attributes may specify updates to the game data 34. For example, timer data may specify one or more timers (e.g., elapsed time, time since a particular event, virtual time of day, etc.), which may cause the game data 34 (e.g., the object data 42, level data 44 and/or character data 46) to be updated. By way of another example, objects not controlled by the player 7 may collide (bounce off, merge, shatter, etc.), which may cause the game data 34 e.g., the object data 42, level data 44 and/or character data 46 to be updated in response to a collision.

Figure 4:
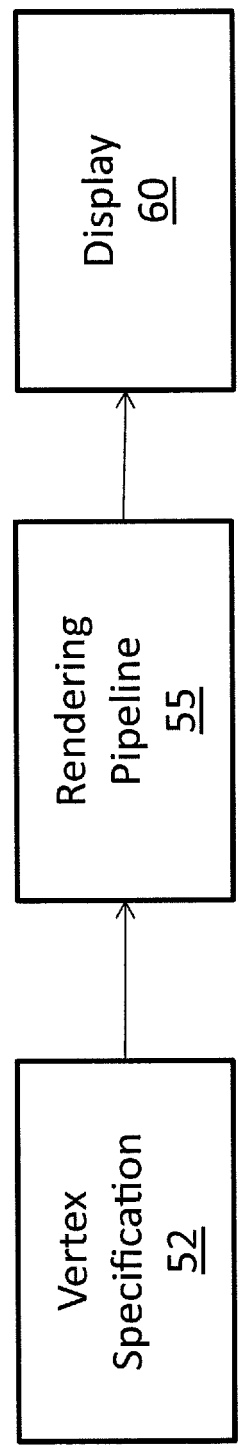
FIG. 4 illustrates an example of a process of converting a 3D graphics scene to a game image for display on a display device.

In general the game data 34 (e.g., the representations and/or attributes of the objects, levels, and/or characters) represents data that specifies a three-dimensional (3D) graphics scene of the game. The process of converting a three-dimensional (3D) graphics scene, which may include one or more 3D graphics objects, into two-dimensional (2D) rasterized game image for display on the display device 5 is generally referred to as rendering. FIG. 4 illustrates an example of a process of converting a 3D graphics scene to a game image for display on the display device 5 via the screen. At step 52, the game data processing function 22 processes the data that represents the three-dimensional (3D) graphics scene of the game and converts this data into a set of vertex data (also known as a vertex specification). The vertex data is suitable for processing by a rendering pipeline (also known as a graphics pipeline). At step 55, the game rendering processing function 24 processes the vertex data according to the rendering pipeline. The output of the rendering pipeline is typically pixels for display on the display device 5 via the screen (step 60).

More specifically, at step 52, the 3D graphics objects in the graphics scene may be subdivided into one or more 3D graphics primitives. A primitive may refer to a group of one or more vertices that are grouped together and/or connected to define a geometric entity (e.g., point, line, polygon, surface, object, patch, etc.) for rendering. For each of the 3D graphics primitives, vertex data is generated at this step. The vertex data of each primitive may include one or more attributes (e.g., position, the color, normal or texture coordinate information, etc.). In deriving the vertex data, a camera transformation (e.g., rotational transformations) may occur to transform the 3D graphics objects in the 3D graphics scene to the current view or camera angle. Also, in deriving the vertex data, light source data (e.g., direction, position, color and/or intensity) may be taken into consideration. The vertex data derived at this step is typically an ordered list of vertices to be sent to the rendering pipeline. The format of the ordered list typically depends on the specific implementation of the rendering pipeline.

At step 55, the game rendering processing function 24 processes the vertex data according to the rendering pipeline. Rendering pipelines are known in the art (e.g., OpenGL, DirectX, etc.); regardless of the specific rendering pipeline used to implement the rendering pipeline, the general process of the rendering pipeline is to create a 2D raster representation (e.g., pixels) of a 3D scene. The rendering pipeline in general calculates the projected position of the vertex data in to two-dimensional (2D) screen space and performs various processing which may take into consideration lighting, colour, position information, texture coordinates and/or any other suitable process to derive the game image (e.g., pixels) for output on the display device 5 (step 60).

In some cases, the game apparatus 1 is distributed between a server on the internet and one or more internet appliances. Plural players may therefore participate in the same online game, and the functionality of the game program (the game rendering processing function and/or the game data processing function) may be executed at least in part by the server.

Figure 7:
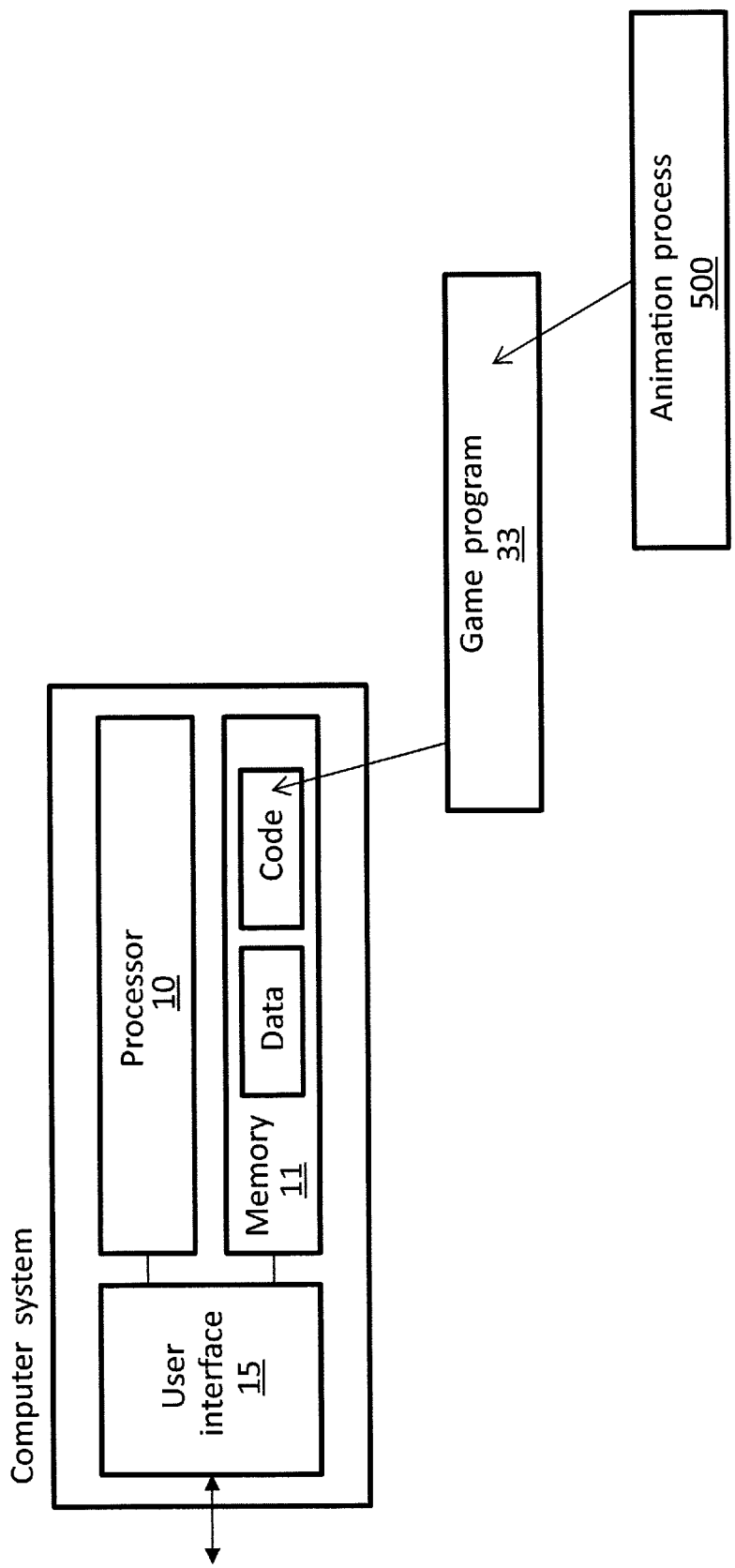
FIG. 7 conceptually illustrates storage of a game program that includes an animation process in a section of a memory reserved for computer-readable instructions executable by a processor.

With reference to FIG. 7, it is noted that the game apparatus 1 may be a computer system (such as a gaming console or PC) and the input/output module 15 (or user interface) may implement a player interface for interacting with the player 7 via the game controller 3 and the display device 5. The computer readable memory 11 stores game data 34 and program instructions (code). The processor 10 executes the program instructions stored in the computer readable memory 11, including the operating system (not shown in FIG. 7) and the game program 33. In executing the game program 33, the processor 10 maintains a (simulated) game environment with objects, characters and levels. The characters include a main "playing" character (controlled by the player 7) and, if appropriate, one or more non-playing characters (NPCs).

Figure 5:
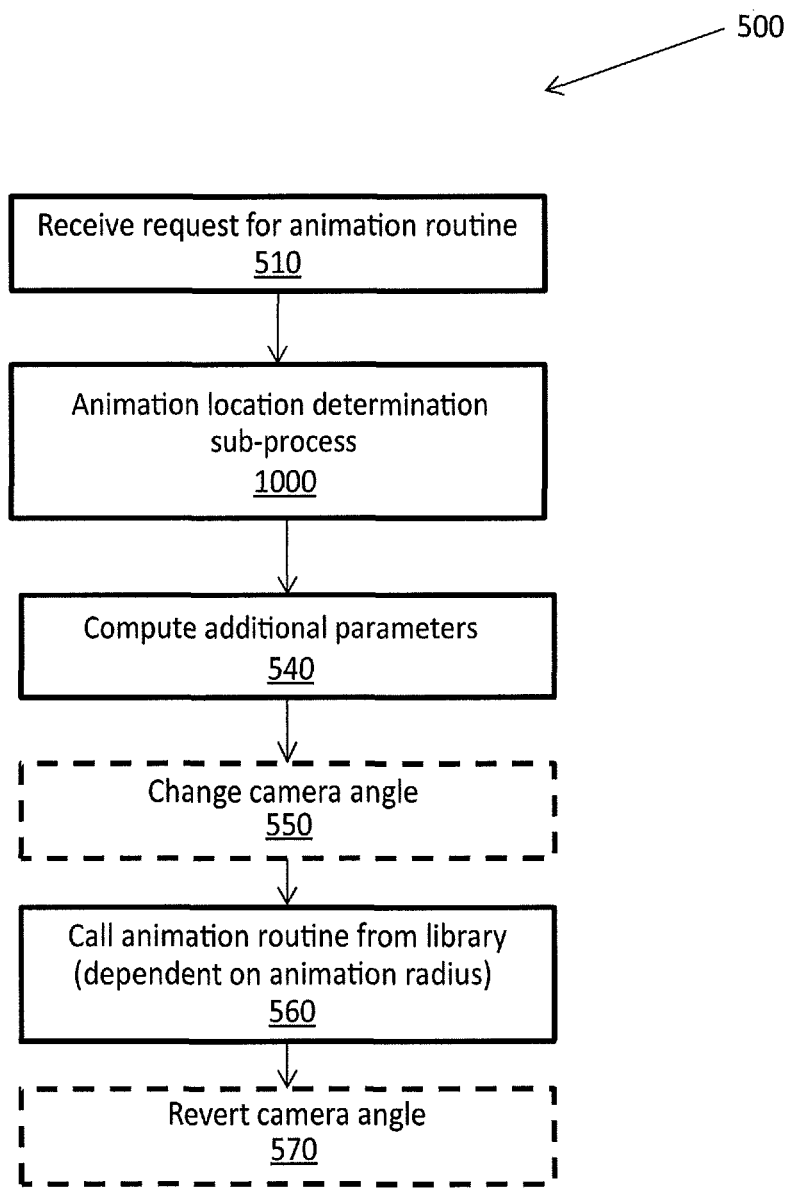
FIG. 5 is a flowchart showing steps in an animation process forming part of the game program executed by the game apparatus, according to a non-limiting embodiment.

Embodiments of the present invention may be concerned with determining a location for placing a requested animation routine involving one or more characters. This may be achieved as part of an animation process 500 of the game program 33, as shown in FIG. 7 and further detailed in a series of steps shown in FIG. 5.

According to a non-limiting embodiment, the animation process 500 starts with the execution of step 510, wherein the processor 10 receives a request for an animation routine. The request for an animation routine may identify the requested animation routine and may be received in a variety of ways.

In one example, the request for an animation routine is received as a result of player action. For instance, in executing part of the game program 33, the processor 10 detects an indication from a player that conveys a desire of the player to carry out an animation routine (e.g., a multi-character animation routine or a takedown) involving his/her playing character and possibly one or more non-playing characters (NPCs). This indication may be received from the player via the input/output module 15 further to a prompt supplied by the processor 10, such prompt having been generated when certain game conditions are found to have been met. Those skilled in the art will recognize that a takedown may refer to a close combat animation between a player character and one or more non-player character.

By way of non-limiting example, consider that the playing character comes within a certain distance (in the game environment) of a particular NPC. The processor 10, in executing the game program 33, detects this proximity and begins a set of basic tests, for example, whether there is a direct path between the playing character and the particular NPC. Once the tests have been conducted and reveal the playing character is within a certain critical distance of the NPC (e.g., 15 cm in the game environment), the processor 10 presents the player with an option of initiating a takedown and, in some cases, presents the player with a choice in terms of the type of takedown (lethal vs. non-lethal). The player's response to this prompt can correspond to the indication referred to above, namely, the indication from the player that conveys a desire of the player to carry out an animation routine.

In another embodiment, the request for an animation routine may be automatically generated by the processor 10 upon determining that certain conditions are met, without providing the player with a prompt or an option to initiate an animation routine.

Prior to calling the requested animation routine, which is shown at step 560 and described later on, certain parameters may need to be computed. One such parameter is a location in the (simulated) game environment for hosting the requested animation routine, which is determined by virtue of an "animation location determination sub-process" 1000. Other parameters are discussed later on in the context of step 540.

The animation location determination sub-process 1000 includes a plurality of steps 1018-1034 that are performed as now described in further detail with reference to FIG. 10. Basically, the animation location determination sub-process 1000 seeks to identify a location in the environment whose surrounding area is free to host the requested animation routine of a certain size. If such a location can be found, the sub-process 1000 is said to have converged. If such a location cannot be found, an alternate location is selected as the animation location.

Accordingly, a suitable location for the requested animation routine may be one that is substantially free of obstructions in its vicinity (within the game environment). Thus, at step 1022 the processor 10 invokes (calls) a "pathfinding function". Computer-readable instructions for executing the pathfinding function may be stored in the code section of the memory 11. One non-limiting example of a pathfinding function that may be used for this purpose is provided by NavPower™, a commercial pathfinding package available from BabelFlux LLC and on the Internet at http://www-.navpower.com/. This and other pathfinding functions aim to determine whether there is an unobstructed area or volume in the vicinity of a chosen location.

When initially called, the pathfinding function may be provided with an "animation radius" (determined at step 1018) and a certain "initial animation location" (determined at step 1020). In particular, the animation radius refers to the dimensions of a 2-D space around a certain point within which all the movements of the body parts of the character(s) involved in the animation routine are contained. The animation radius is thus indicative of the space taken up by the animation routine, and may vary from one requested animation routine to another. In some embodiments, the space represented by the "animation radius" may refer to an area, while in others it may refer to a volume representative of a 3-D virtual space in the game environment taken up by the takedown (or other requested animation routine).

The animation radius, determined at step 1018, may be pre-established (set) by a designer/producer of the ga me, as a function of the type of animation. It may be defined by a set of animated bones on the digital skeleton (also referred to as a "rig") of each character involved in the animation. The list of bones to be animated for a given animation can be customized to avoid setting animation radii that are too large based on bones that will not contribute visually to the action on-screen. It is also possible for the game designer to include in the animation radius a bone that controls the camera, to ensure that the camera can get close to the action without any obstructions from the environment. Alternatively, if the bone that controls the camera is not included in the computation of the animation radius, this will require the camera to safely resolve collisions with the environment during execution of the animation routine in real-time.

The animation radius may be pre-calculated for various animation routines, so that determining the animation radius need not require real-time computations and could be as simple as looking up the required parameter in memory on the basis of the requested animation routine. With reference to FIG. 6A, there is shown a non-limiting example of a table that may be stored in the memory 11 and which stores the animation radii for different animation routines that may be requested. As such, an animation routine may be associated with a data element that indicates the animation radius that it occupies.

Figure 9:
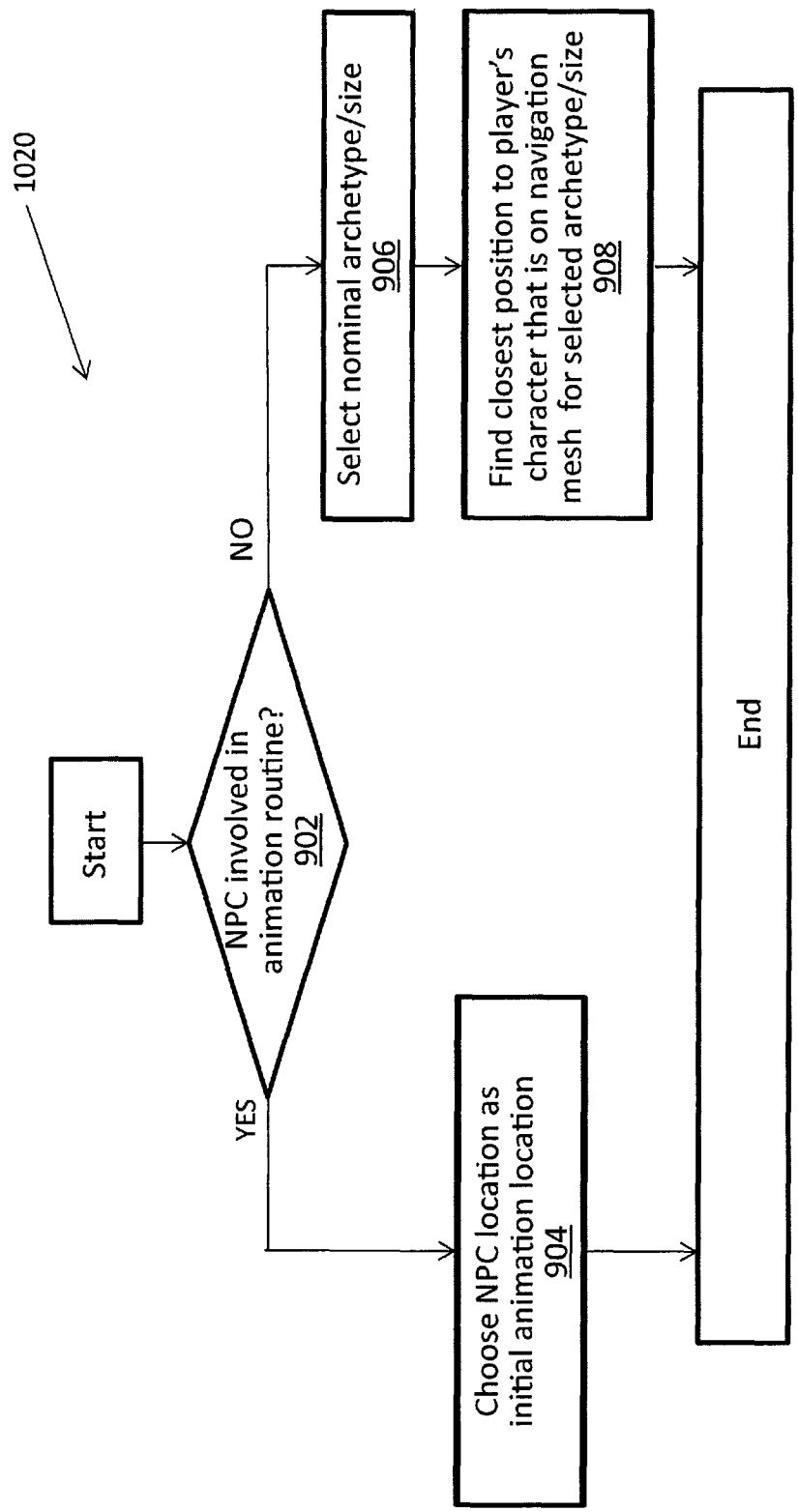
FIG. 9 conceptually shows implementation of an initial animation location selection function for selecting where to initially place an animation routine before being influenced by detection of the obstacle.

The "initial animation location" used to call the first iteration of the pathfinding function at step 1022, is related to the location of the main character and any NPCs involved in the requested animation routine. In particular, to determine the initial animation location at step 1020, an initial animation location selection function may be carried out, as now described with reference to the flowchart in FIG. 9. By way of background, reference may be had to the notion of a "navigation mesh". The navigation mesh is defined for a character's archetype (e.g., hero, villain, bystander, . . . ) and/or may be dependent on the character's size (e.g., small, medium, large, . . . ). The navigation mesh specifies the collection of zones or paths in the game environment in which the character is allowed to travel or navigate. Now, the initial location of one of the NPCs (if any) involved in the requested animation routine may be used as the initial animation location (see the YES branch out of step 902 and step 904). Because the NPC is guaranteed to be on its own navigation mesh, this is a sensible (and computationally simple) initial choice of location for the animation because there is by default at least a certain non-zero obstacle-free radius to accommodate the NPC's archetype. If there is no NPC in the requested animation routine (see the NO branch out of step 902), the algorithm may invoke a further function (see step 908) to obtain the closest position to the player's character that is on the navigation mesh for a selected archetype of a selected size (see step 906).

Figure 10:
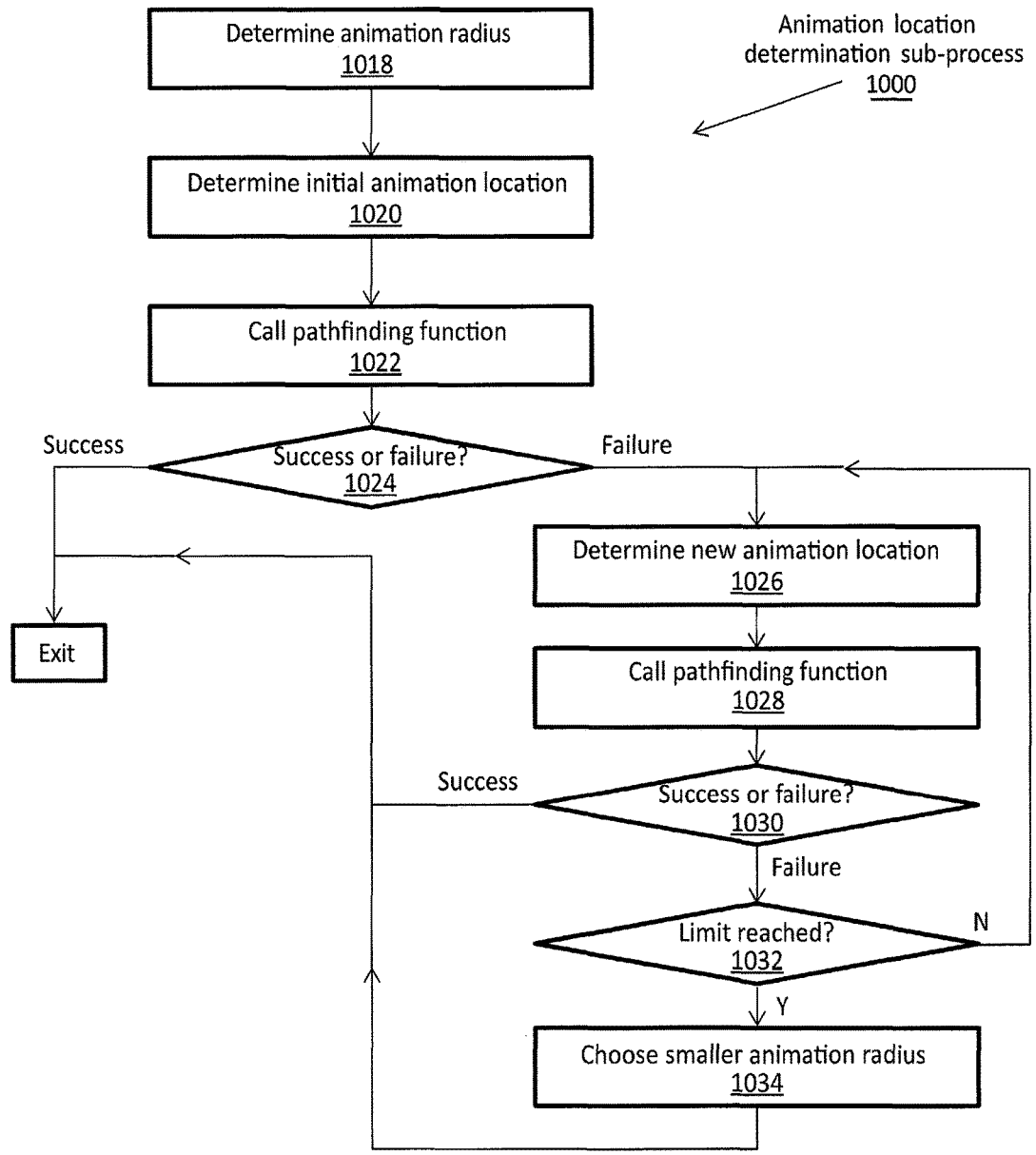
FIG. 10 is a flowchart showing steps in an animation location determination sub-process forming part of the animation process of FIG. 5 game program executed by the game apparatus, according to a non-limiting embodiment.

Returning now to the animation location determination sub-process 1000 of FIG. 10, the pathfinding function is thus called at step 1022 using the animation radius determined at step 1018 and, initially, using the initial animation location determined at step 1020 as discussed above with reference to FIG. 9. As shown at step 1024, the pathfinding function outputs either "success" or "failure". "Success" means that an area in the game environment around the initial animation location is free of obstructions (within the animation radius) and that the requested animation routine can therefore be freely carried out in an unobstructed way. In other words, there is a determination as to whether there is sufficient available space to host the animation routine at the initial animation location.

In this case, the initial animation location is used as the "final" animation location, terminating the animation location determination sub-process 1000, and the processor 10 executing the game program 33 proceeds to compute further parameters at step 540 of the animation process 500, which will be described later.

On the other hand, "failure" at step 1024 means that an obstruction was encountered somewhere within the animation radius of the initial animation location. In this case, the pathfinding function called at step 1022 will produce information about the point or region where an obstruction occurs. There are two uses for this information. Firstly, this information can be interpreted as the maximum radius around the initial animation location that is guaranteed to be exempt of obstacles, which may be used later if it is determined that the animation location determination sub-process 1000 does not "converge". Secondly, the processor 10 also uses this information about the obstruction as a heuristic to guide its next iteration through the animation location determination sub-process 1000. Specifically, at step 1026, the processor 10 determines a new animation location. The new animation location can be at a point that is in a direction different (e.g., opposite) from the detected obstruction (which was the cause of the pathfinding function outputting a failure to begin with).

Figure 8:
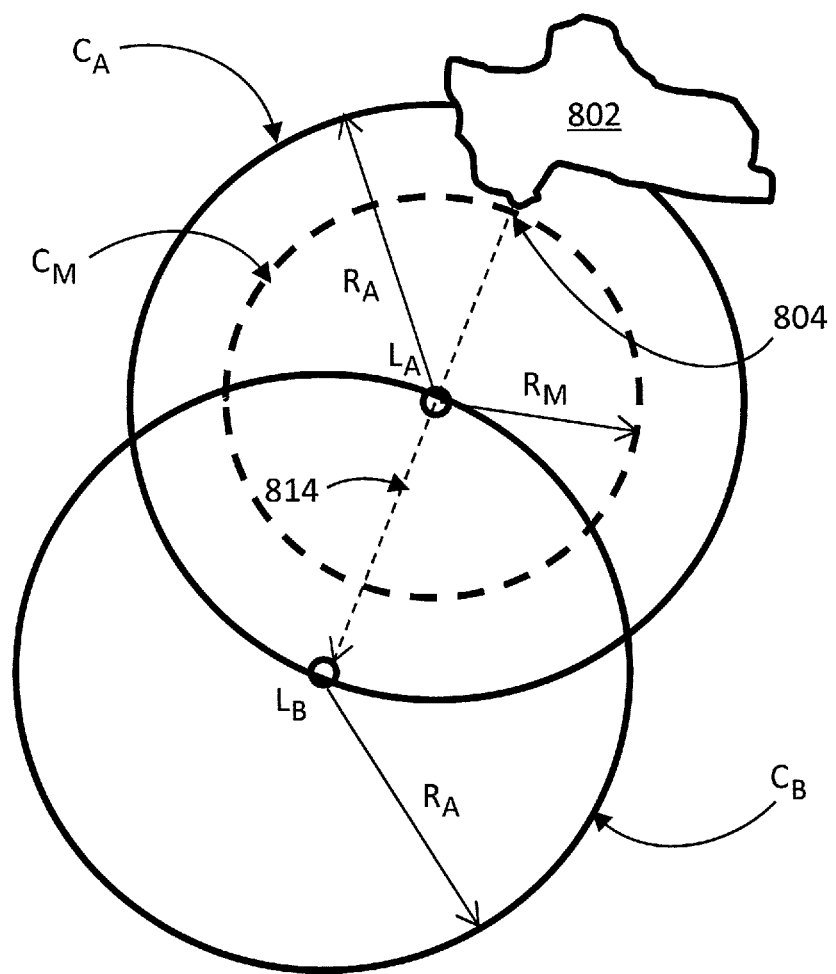
FIG. 8 illustrates migrating where to place an animation routine based on detection of an obstacle.

For example, FIG. 8 shows an initial animation location $L_A$ and an obstacle 802, as well as a region (in this case a disk, although it need not be such) conceptually represented by a circle $C_A$ corresponding to the animation radius $R_A$. Due to the presence of the obstacle 802 within the region defined by the circle $C_A$, step 1024 will result in a "failure". The pathfinding function then outputs a maximum radius $R_M$ around the initial animation location wherein there are no obstacles. The maximum radius $R_M$ defines a circle $C_M$. Also, the pathfinding function will determine a direction, in this case represented by arrow 814, oriented in a direction that is different from the direction in which the obstacle 802 is located. For example, this "different" direction could be the diametrically opposite direction, relative to the initial animation location $L_A$. There can be flexibility in choosing how to orient the direction of the arrow 814. In some embodiments, it could be the direction opposite the point closest to the initial animation location $L_A$ where the obstacle 802 is reached (namely point 804 which is on the circle $C_M$). In other embodiments, it could be calculated based on the direction, relative to location $L_A$, of a center of mass of the obstacle 802. Also, a selection mechanism may be put in place (e.g., random selection or based on other criteria) when there is more than one obstacle in the region defined by the animation radius $R_A$ and circle $C_A$, or where multiple points on the obstacle 802 are reached at the same minimum distance from the initial animation location $L_A$.

Continuing with the carrying out of the sub-process 1000, a new animation location is determined at step 1026. For example, with continued reference to FIG. 8, a new animation location $L_B$ is determined as being along the direction of the arrow 814 (e.g., opposite the location of the point of contact 804 on the obstacle 802) and will be the center about which the animation radius $R_A$ will next be drawn, thereby leading to the creation of a circle $C_B$. The distance between the previous animation location $L_A$ and the new animation location $L_B$ can depend on the embodiment. In this embodiment, the new animation location $L_B$ is located on the circle $C_A$, but it could also be located on the circle $C_M$ or it could be computed based on other criteria or it could be move by a fixed amount. The distance between successive animation locations (e.g., $L_A$ and $L_B$) leads to a trade-off between the number of iterations (and therefore the computational effort) that it will take before the animation location determination sub-process 1000 converges and the potential to produce, on-screen, the appearance of an unrealistic change in the location of the takedown relative to the location of the main character.

The aforementioned approach is one example of a heuristic approach towards finding an animation location that has a greater chance of success at step 1024, but it will be apparent that other approaches may be used by persons skilled in the art. Some of these approaches rely on selecting a new animation location $L_B$ that is oriented relative to the previous animation location $L_A$ in a way that depends on the orientation of the obstacle relative to the previous animation location $L_A$. Other approaches may also be used.

After completion of step 1026, which will have resulted in the determination of a new animation location $L_B$, a second iteration of the pathfinding function is called at step 1028 using, optionally, the same animation radius $R_A$ as before, this time surrounding the new animation location $L_B$. Again, and with reference to step 1030, the pathfinding function outputs either success or failure. If there is success, the new animation location $L_B$ is used as the "final animation location", which terminates the animation location determination sub-process 1000, and the processor 10 executing the game program 33 proceeds to step 540 of the animation process 500, as will be described later on.

On the other hand, failure at step 1030 means that a new obstruction was encountered somewhere within the animation radius $R_A$ around the new animation location $L_B$. Here again, the output of the pathfinding function 1028 would include the location of the new obstruction, which allows the sub-process 1000 to determine the maximum radius around the new animation location $L_B$ that is guaranteed to be exempt of obstacles, which may be used later if the animation location determination sub-process 1000 is found not to converge. The sub-process 1000 returns to step 1026, where a further new animation location is located as per the criteria mentioned above, which is followed again by a reiteration of step 1028 where the next iteration of the pathfinding function is called, and so on.

It is noted that a certain failure limit may be reached, in which case the animation location determination sub-process 1000 can be said to not have converged. This can occur, for example: (i) after a certain number of iterations; or (ii) after a certain amount of time; or (c) if the animation location determination sub-process 1000 has been interrupted prior to occurrence of a successful outcome of the pathfinding function at step 1022 and 1028. The failure limit is tested for at step 1032. In the affirmative (i.e., the failure limit has been reached), the processor 10 proceeds to extract from the memory 11 an animation location known to have the greatest "maximum obstacle-free animation radius", as calculated by an earlier iteration of the pathfinding function (at step 1022 or 1028).

For example, in the illustrated embodiment of FIG. 8, in the case where the failure limit is reached, it will be recalled that $R_M$ represented the largest obstacle-free radius for animation location $L_A$ (and is smaller than the animation radius $R_A$), and would have been calculated earlier and stored earlier. In the event that location $L_A$ would have the a obstacle-free animation radius $R_M$ that is the largest among such radii for all other animation locations, then $L_A$ would be selected as the final animation location (with an animation radius of $R_M$). The animation location determination sub-process 1000 terminates, and the game program 33 proceeds to step 540 of the animation process 500, as will now be described.

From the above, it will be noted that step 540 can be arrived at under various circumstances. In each case, the sub-process 1000 exits by having produced a final animation location that has an obstruction-free radius. In some cases (i.e., when the animation location determination sub-process 1000 converges) this radius will be the animation radius $R_A$ and in other cases (i.e., when the animation location determination sub-process 1000 does not converge) this radius (e.g., $R_M$) is smaller than the animation radius $R_A$. In either case, execution of the animation location determination sub-process 1000 leads to step 540 of the animation process 500.

At step 540, the processor 10 determines certain additional parameters needed for calling the requested animation routine, in addition to the final animation location. For example, there could be a level of granularity in selecting a version of the requested animation routine depending on (i) at least one contextual parameter (e.g., stealth vs combat, left-handed vs. right-handed, power level of playing character or NPC, etc.); (ii) a physical space constraint parameter.

The physical space constraint parameter will now be discussed in greater detail. Specifically, when the animation location determination sub-process 1000 converges, this means that the requested animation routine can take up the full space defined by the animation radius $R_A$. However, when the final animation radius is less than the animation radius (i.e., due to non-convergence of the animation location determination sub-process 1000), then a constrained version of the animation routine would need to be selected, i.e., one that takes place within a more severely constrained volume. FIG. 6B is a non-limiting example of a table in which different versions of the same animation routine are stored in memory, each with a different "constrained" (smaller) animation radius having a certain ratio relative to the "original" animation radius. Thus, multiple versions of the same requested animation routine may exist, and in order to call the correct version, one can supply the final animation radius as a parameter, and the processor 10 can determine which version of the requested animation routine can be supported.

Different techniques for creating constrained versions of the same animation routine may be used. One way to create an animation routine with a shrunken radius is to constrain the reach of the maneuvers/movements (i.e., to constrain the trajectory of the bones of the rig) in the animation routine so that they are executed in more of a phone booth-like environment. Another way to create a version of an animation routine having a shrunken animation radius is to reduce the number of NPCs participating in the animation routine. For example, if the player requested a takedown involving X (X>1) NPCs, then the takedown could be modified so that it only involves X−1 NPCs. As such, this situation is equivalent to the player having requested a takedown involving a smaller number of NPCs. The NPCs remaining in the takedown could be selected in any suitable manner, e.g., those closest to the playing character, those that are the strongest, etc. Different versions of the same takedown could therefore be called for different animation radii, each different animation radius corresponding to a different number of NPCs in the takedown.

Another parameter that could be provided when calling the requested animation routine at step 560 of the animation process 500 could be an angle of rotation. As such, the angle could be selected so as to control whether the playing character is placed in the middle of the area selected for the requested animation routine or at the edge. For example, rotating the requested animation routine may reduce the appearance of location transitions before and during the animation routine.

Another parameter could be the slope of the terrain. For example, it should be appreciated that the pre-computed vertex trajectories of an animation routine may assume that the characters are disposed on a flat surface. Yet, different versions of the same takedown may be pre-computed for a variety of slopes or ledges (staircases) so that, depending on the terrain, the animation routine can occur in a sloped or stepped area and still appear realistic when rendered. This can be done by specifying the slope when querying the pathfinding function at step 1022 or 1028 of the sub-process 1000, so as not to lose the allure of realism when the final images are rendered. The NavPower™ pathfinding function has such an option. In other embodiments, different versions of an animation routine may be pre-computed for a limited number of sloped terrains, and the appropriate version selected according to the matching slope. In yet another embodiment, the animation routine could be pre-computed for a terrain having a specified slope, and then the pathfinding function (at steps 1022 and 1028) could be tasked with locating a zone in the game environment having the sought-after specified slope.

The above notions can be applied to more complex topographical/environmental structures, and generally to any contextual variable, although it should be kept in mind that each pre-computed animation routine consumes memory and therefore there will be an increase in the memory requirement when multiple almost identical animation routines—but for the contextual variables—need to be stored.

At step 560 of the animation process 500, the game program 33 calls the requested animation routine from a library in memory, using the final animation location (as determined by the animation location determination sub-process 1000) and the other aforementioned parameters (as determined by step 540 of the animation process 500 as well as possibly other parameters). It is noted that the requested animation routine may correspond to a pre-determined time-wise trajectory of vertices and, as such, it still requires rendering in real-time to incorporate the current scene's texture and lighting and other parameters.

It should also be appreciated that camera angles can optionally also be changed. For instance, at step 550 of the animation process 500, the game program 33 may optionally change the camera angle, for example, from $1^{st}$ person camera to $3^{rd}$ person camera in order to allow the player to view the animation routine from "outside" the playing character's body.

Then, after the selected animation routine has ended, the camera may optionally revert to its previous angle, e.g., $1^{st}$ person (step 570). Eliminated NPC(s) can be converted into a ragdoll, which can stay in the environment if the animation routine occurred within the permitted travel path of the NPC(s), or the NPC(s) can be ejected from the game environment.

It should be appreciated that in addition to avoiding that the animation routine show character clipping with the environment, the animation location determination sub-process 1000 also avoids putting ragdolls inside collisions. In particular, if an NPC is defeated during a takedown and turns into a ragdoll, once the takedown ends and gameplay resumes, physics takes over and the ragdoll can fall to the floor (which is known to be clear of obstacles due to operation of the sub-process 1000). However, had the floor not been clear of obstacles, and if an environment collision had occurred just prior to the takedown ending, the resumption of gameplay may inaccurately transfer knowledge about the collision, and the ragdoll may interact unexpectedly with the game environment, possibly passing through objects or being ejected from the game world altogether.

A transition (e.g., fade-to-black) may be used when transitioning camera angles (steps 550, 570) and/or when moving the characters to the identified area where the animation is to take place (step 540).

Of course, certain of the above steps (of the animation process 500 or the animation location determination sub-process 1000) may be executed in a different order than shown.

It should be appreciated that certain ones of the steps described above may be pre-computed before the game program learns that the player has requested an animation routine at step 510.

While the above has considered an animation volume as being defined by a radius, in other embodiments, the animation volume may be defined as a cylinder having not only a radius but also a height, or a prism having a length, width and height, or an even more complex three-dimensional structure.

While the above description and diagrams have provided a description and illustration of several example embodiments, it should be appreciated that variations are possible while remaining within the scope of the invention. For example, certain elements that are expected to be known or common to a person of ordinary skill in the art have not been described, while certain features that have been described may be omitted in some embodiments and included in others. Those skilled in the art will of course appreciate that the invention is only to be limited by the claims attached hereto.

The invention claimed is:

1. A method for execution by a processor of a computer system, comprising:
   maintaining a game environment;
   receiving a request to execute an animation routine during gameplay;
   attempting to identify a location in the game environment having a surrounding area that is free to host the requested animation routine; and
   in case the attempting is successful, carrying out the animation routine at the identified location in the game environment;

wherein attempting to identify a location in the game environment having a surrounding area that is free to host the requested animation routine comprises:
  a) determining whether an area surrounding an initial location is free to host the requested animation routine;
  b) in case the area surrounding the initial location is not free to host the requested animation routine, selecting a next location;
  c) determining whether an area surrounding the next location is free to host the requested animation routine;
  d) in case the area surrounding the next location is not free to host the requested animation routine, selecting another next location; and
  wherein the attempting is considered successful when any of steps a) or c) determines a location that is free to host the requested animation routine.

2. The method defined in claim 1, further comprising repeating steps c) and d).

3. The method defined in claim 2, wherein the attempting is considered unsuccessful when neither step a) nor step c) determines a location that is free to host the requested animation routine, after a predetermined number of iterations of step c).

4. The method defined in claim 1, wherein the area surrounding a particular location is considered not to be free to host the requested animation routine when an obstacle is detected to be present within a predetermined distance from the particular location.

5. The method defined in claim 4, wherein selecting the next location comprises selecting a location that is oriented relative to the initial location in a direction away from the obstacle.

6. The method defined in claim 1, further comprising determining a slope of terrain in a vicinity of the initial location and restricting the next location to one having a corresponding slope of terrain.

7. The method defined in claim 1, further comprising determining a slope of terrain in a vicinity of the initial location and wherein carrying out the requested animation routine comprises selecting a version of the requested animation routine based on the slope of terrain and calling the selected version of the requested animation routine.

8. The method defined in claim 1, wherein the initial location corresponds to a location of a non-playing character involved in the animation routine.

9. The method defined in claim 1, wherein in case there is no non-playing character involved in the animation routine, the initial location corresponds to a position that is on a navigation mesh for a nominally selected archetype.

10. The method defined in claim 1, the method further comprising: determining an animation radius, wherein attempting to identify a location in the game environment having a surrounding area that is free to host the requested animation routine comprises attempting to identify a location in the game environment that is unobstructed in an area defined by the animation radius relative to that location.

11. The method defined in claim 10, wherein the area defined by the animation radius is a three-dimensional area.

12. The method defined in claim 1, further comprising rendering the animation routine for display via a player interface.

13. The method defined in claim 1, wherein the animation routine is a takedown involving one or more non-playing characters (NPCs).

14. The method defined in claim 1, wherein the animation routine is a multi-character animation routine.

15. The method defined in claim 1, further comprising restricting the identified location to locations along a path in the game environment along which at least one character involved in the requested animation routine is free to navigate.

16. The method defined in claim 1, wherein attempting to identify a location in the game environment having a surrounding area that is free to host the requested animation routine comprises executing a pathfinding function using the initial location, an animation radius and a navigational mesh of at least one character involved in the requested animation routine.

17. The method defined in claim 1, wherein identifying the location in the simulated environment comprises iteratively computing locations having unobstructed areas until a location having an area of sufficient size to host the animation routine or a constrained version thereof is identified.

18. The method defined in claim 1, further comprising, in case the attempting is successful, calling the animation routine at the identified location in the game environment.

19. The method defined in claim 1, further comprising changing a camera angle prior to carrying out the requested animation routine.

20. The method defined in claim 19, further comprising, after carrying out the requested animation routine, reverting the camera angle to the angle it had prior to carrying out the requested animation routine.

21. A method for execution by a processor of a computer system, comprising:
  maintaining a game environment;
  receiving a request to execute an animation routine during gameplay;
  attempting to identify a location in the game environment having a surrounding area that is free to host the requested animation routine;
  in case the attempting is successful, carrying out the animation routine at the identified location in the game environment;
  determining an animation radius, wherein attempting to identify the location in the game environment having the surrounding area that is free to host the requested animation routine comprises attempting to identify a location in the game environment that is unobstructed in an area defined by the animation radius relative to that location; and
  in case the attempting is unsuccessful, determining a location having a surrounding area that is unobstructed within a reduced animation radius less than the animation radius, and constraining the requested animation routine to the reduced animation radius.

22. The method defined in claim 21, wherein constraining the requested animation routine to the reduced animation radius comprises calling the requested animation routine with the reduced animation radius.

23. The method defined in claim 21, wherein constraining the requested animation routine to the reduced animation radius comprises selecting a constrained version of the requested animation routine based on the reduced animation radius and calling the constrained version of the requested animation routine.

24. The method defined in claim 21, wherein constraining the requested animation routine to the reduced animation radius comprises selecting a constrained version of the requested animation routine based on the reduced animation radius and calling the constrained version of the requested animation routine.

25. A computer system, comprising:
   a memory storing data and program instructions, the data representing a game environment;
   a processor configured to execute the program instructions stored in the memory, such that execution of the program instructions causes the computer to implement a method that comprises:
   receiving a request to execute an animation routine;
   attempting to identify a location in the game environment having a surrounding area that is free to host the requested animation routine; and
   in case the attempting is successful, carrying out the animation routine at the identified location in the game environment;
   wherein attempting to identify a location in the game environment having a surrounding area that is free to host the requested animation routine comprises:
   a) determining whether an area surrounding an initial location is free to host the requested animation routine;
   b) in case the area surrounding the initial location is not free to host the requested animation routine, selecting a next location;
   c) determining whether an area surrounding the next location is free to host the requested animation routine;
   d) in case the area surrounding the next location is not free to host the requested animation routine, selecting another next location; and
   wherein the attempting is considered successful when any of steps a) or c) determines a location that is free to host the requested animation routine.

26. The computer system defined in claim 25, further comprising a player interface, wherein the request for the animation routine is generated by the player interface in response to interaction with a user of the computer system.

27. A non-transitory computer-readable medium comprising computer-readable program instructions which, when executed by a processor of a computer system running a game environment, causes the processor to implement a method in the game environment, the method comprising
   receiving a request to execute an animation routine;
   attempting to identify a location in the game environment having a surrounding area that is free to host the requested animation routine; and
   in case the attempting is successful, carrying out the animation routine at the identified location in the game environment
   wherein attempting to identify a location in the game environment having a surrounding area that is free to host the requested animation routine comprises:
   a) determining whether an area surrounding an initial location is free to host the requested animation routine;
   b) in case the area surrounding the initial location is not free to host the requested animation routine, selecting a next location;
   c) determining whether an area surrounding the next location is free to host the requested animation routine;
   d) in case the area surrounding the next location is not free to host the requested animation routine, selecting another next location; and
   wherein the attempting is considered successful when any of steps a) or c) determines a location that is free to host the requested animation routine.

* * * * *